US010111798B2

United States Patent
Meiser et al.

(10) Patent No.: US 10,111,798 B2
(45) Date of Patent: Oct. 30, 2018

(54) METHOD OF FORMING SHEET METAL CASKET SHELL

(71) Applicant: Batesville Services, Inc., Batesville, IN (US)

(72) Inventors: Daniel G. Meiser, Wilder, KY (US); Ilija Rojdev, Cincinnati, OH (US)

(73) Assignee: Batesville Services, Inc., Batesville, IN (US)

( * ) Notice: Subject to any disclaimer, the term of this patent is extended or adjusted under 35 U.S.C. 154(b) by 194 days.

(21) Appl. No.: 14/829,922

(22) Filed: Aug. 19, 2015

(65) Prior Publication Data

US 2015/0351987 A1    Dec. 10, 2015

Related U.S. Application Data

(62) Division of application No. 13/079,383, filed on Apr. 4, 2011, now Pat. No. 9,126,257.

(51) Int. Cl.
*A61G 17/007* (2006.01)
*B21D 51/26* (2006.01)
(Continued)

(52) U.S. Cl.
CPC ............ *A61G 17/0076* (2013.01); *B21B 1/22* (2013.01); *B21D 51/2646* (2013.01);
(Continued)

(58) Field of Classification Search
CPC .. A61G 17/0076; B21B 1/22; B21D 51/2646; B21D 51/52; B23K 31/02; Y10T 428/1241
(Continued)

(56) References Cited

U.S. PATENT DOCUMENTS 629,245 A    7/1899   Frank
801,264 A    10/1905  Post
(Continued)

FOREIGN PATENT DOCUMENTS

WO    0071278 A1    11/2000

OTHER PUBLICATIONS

Lucas Catalog, 11 pages, undated but before at least Apr. 4, 2011.

*Primary Examiner* — William L Miller
(74) *Attorney, Agent, or Firm* — Wood Herron & Evans LLP

(57) ABSTRACT

A method of forming a pair of opposed side walls and a pair of opposed end walls of a sheet metal casket shell from a single piece of sheet metal. The piece of sheet metal has opposite ends and a length equal to the combined length of the pair of side walls and the pair of end walls of the casket shell to be formed. The opposite ends of the piece of sheet metal are secured together to form a tube. A roll forming roller is positioned in an interior of the tube. A female die configured to produce a desired profile for the side walls and the end walls of the casket shell is positioned around an exterior of the tube. The roller is moved outwardly so as to contact an interior surface of the tube and deform the tube toward a die cavity of the female die. The roller is rolled around a perimeter of the interior of the tube so as to deform the perimeter of the tube toward the die cavity of the female die. The desired profile for the side walls and the end walls of the casket shell is thereby produced.

3 Claims, 11 Drawing Sheets

(51) Int. Cl.
  *B21B 1/22* (2006.01)
  *B23K 31/02* (2006.01)
  *B21D 51/52* (2006.01)
(52) U.S. Cl.
  CPC .............. *B21D 51/52* (2013.01); *B23K 31/02* (2013.01); *Y10T 428/1241* (2015.01)
(58) Field of Classification Search
  USPC ................. 27/6; 72/203; 428/603; 413/1
  See application file for complete search history.

(56) References Cited

U.S. PATENT DOCUMENTS

| | | | |
|---|---|---|---|
| 997,709 | A | 7/1911 | Seery |
| 2,272,111 | A | 2/1942 | Dove |
| 2,529,088 | A | 11/1950 | Leake |
| 2,731,167 | A | 1/1956 | Moore |
| 2,867,029 | A | 1/1959 | Hillenbrand |
| 2,976,611 | A | 3/1961 | Giffen |
| 3,039,414 | A | 6/1962 | Rosanes |
| 3,172,386 | A | 3/1965 | West |
| 3,354,680 | A | 11/1967 | Jacobson |
| 3,601,011 | A | 8/1971 | Ames |
| 4,157,609 | A | 6/1979 | Schutz |
| 4,185,370 | A | 1/1980 | Evans |
| 4,361,021 | A | 11/1982 | McVay et al. |
| 4,901,557 | A | 2/1990 | Schmidt |
| 4,931,239 | A | 6/1990 | Hosoi et al. |
| 4,982,487 | A | 1/1991 | Maruko et al. |
| 5,306,058 | A | 4/1994 | Sturrus et al. |
| 5,499,438 | A | 3/1996 | Schutz |
| 5,619,785 | A * | 4/1997 | Tambussi ............... C23C 4/185 164/46 |
| 5,875,529 | A | 3/1999 | Oilier |
| 5,984,163 | A | 11/1999 | Meier et al. |
| 6,038,758 | A | 3/2000 | Kanai et al. |
| 6,268,066 | B1 | 7/2001 | Swain |
| 6,301,758 | B1 | 10/2001 | Biondo et al. |
| 6,530,254 | B2 | 3/2003 | Beierling |
| 6,561,002 | B2 | 5/2003 | Okada et al. |
| 6,745,442 | B2 * | 6/2004 | Biondo ................ A61G 17/02 27/10 |
| 6,764,559 | B2 | 7/2004 | Li et al. |
| 6,823,705 | B2 | 11/2004 | Fukuda et al. |
| 6,948,141 | B1 | 9/2005 | Satya et al. |
| 7,247,264 | B2 | 7/2007 | Buchler et al. |
| 7,278,285 | B2 | 10/2007 | Sano et al. |
| 7,377,016 | B2 | 5/2008 | Kelly |
| 7,464,574 | B2 | 12/2008 | Durney et al. |
| 7,584,639 | B2 | 9/2009 | Boltshauser |
| 7,748,597 | B2 | 7/2010 | Nicolai et al. |
| 8,661,633 | B2 * | 3/2014 | Filipek ............... A61G 17/0076 16/308 |
| 8,789,250 | B2 * | 7/2014 | Meiser .................. B21D 7/024 228/173.6 |
| 2004/0181870 | A1 | 9/2004 | Bohacik et al. |
| 2007/0101559 | A1 | 5/2007 | Poteet |
| 2009/0206096 | A1 | 8/2009 | Hirotsu et al. |
| 2010/0272542 | A1 | 10/2010 | Mueller et al. |
| 2010/0275422 | A1 | 11/2010 | Rojdev et al. |
| 2011/0296656 | A1 | 12/2011 | Filipek et al. |
| 2012/0096692 | A1 | 4/2012 | Filipek et al. |
| 2015/0351987 | A1 * | 12/2015 | Meiser .................. B21D 51/52 27/6 |

\* cited by examiner

METHOD OF FORMING SHEET METAL CASKET SHELL

RELATED APPLICATIONS

This application is a divisional of U.S. patent application Ser. No. 13/079,383 filed Apr. 4, 2011, which is hereby incorporated by reference herein as if fully set forth in its entirety

FIELD

The subject matter herein relates generally to caskets, and more particularly to methods of forming sheet metal caskets.

BACKGROUND

Referring to FIGS. 1-8, one commonly employed process currently utilized to form sheet metal casket shells is as follows: Two side panels 10, 10 are blanked from a coil 12 of sheet steel (or other suitable sheet metal), and two end panels 14, 14 are blanked from the coil 12. Next, both side panels 10, 10 and both end panels 14, 14 are stamped to form the desired profile of the shell side walls 16, 16 and end walls 18, 18. Next, the four walls 16, 16, 18, 18 are loaded onto a weld fixture and welded together by welders 20, and finally the four welds are ground smooth with grinders 22. At some point along the way a bottom wall or panel (not shown) is welded to the side walls 16, 16 and the end walls 18, 18.

This current process of forming sheet metal casket shells includes a number of disadvantages. Each panel requires at least one blanking operation along with one or two stamping operations. The sheets must be loaded into a first press to be blanked, and then moved to a second press to be stamped. The panels are then moved to a new location where they are loaded onto a fixture that holds the panels in the correct assembled orientation. Each corner is then welded either manually or robotically. The corners contain intricate profiles which add complexity to the welding operation. The welded shell is then moved to a new location where each weld is manually rough ground. Because of the intricate profiles the grinding must be done at a slower pace to insure that only unwanted weld is removed. The shell is then placed on line where the corners are eventually manually finish sanded. All of these operations are labor intensive, and because of the repeated handling of the parts, the parts are susceptible to dents and dings. The welding operations require energy for the welder and consume welding wire. The grinding and sanding operations require energy, consume numerous sanding discs, and produce dust and debris.

It is desirable to improve upon this current method of forming sheet metal casket shells.

SUMMARY

In one aspect, a method of forming a pair of opposed side walls and a pair of opposed end walls of a sheet metal casket shell from a single piece of sheet metal, the piece of sheet metal having opposite ends and having a length equal to the combined length of the pair of side walls and the pair of end walls of the casket shell to be formed, is provided. The method comprises the steps of securing the opposite ends of the piece of sheet metal together to form a tube, positioning a roll forming roller in an interior of the tube, positioning a female die configured to produce a desired profile for the side walls and the end walls of the casket shell around an exterior of the tube, moving the roller outwardly so as to contact an interior surface of the tube and deform the tube toward a die cavity of the female die, and rolling the roller around a perimeter of the interior of the tube so as to deform the perimeter of the tube toward the die cavity of the female die, thereby producing the desired profile for the side walls and the end walls of the casket shell.

The step of securing the opposite ends of the piece of sheet metal together can comprise welding the opposite ends of the piece of sheet metal together. The method can further comprise the step of abutting the opposite ends of the piece of sheet metal before welding the opposite ends of the piece of sheet metal together. The method can further comprise the step of grinding the welded ends of the piece of sheet metal smooth before the steps of moving the roller outwardly into contact with the interior surface of the tube and rolling the roller around an inner circumference of the tube.

The method can further comprise the step of forming the piece of sheet metal into a rectangle before securing the opposite ends of the piece of sheet metal together. The method can further comprise the step of locating the opposite ends of the piece of sheet metal on one of the end walls of the casket shell. For example, the opposite ends of the piece of sheet metal can be located medially of a length of the one end wall of the casket shell.

The female die and the roll forming roller can cooperate to produce a desired base mold profile of the side walls and the end walls of the casket shell. The die cavity of the female die can have a profile substantially the same as the desired base mold profile of the side walls and the end walls of the casket shell.

The female die and the roll forming roller can cooperate to produce a desired top mold profile of the side walls and the end walls of the casket shell. The die cavity of the female die can have a profile substantially the same as the desired top mold profile of the side walls and the end walls of the casket shell.

The female die and the roll forming roller can cooperate to produce a desired base mold profile and a desired top mold profile of the side walls and the end walls of the casket shell. The die cavity of the female die can have a profile substantially the same as the desired base mold profile and the desired top mold profile of the side walls and the end walls of the casket shell.

The method can further comprise the step of severing the piece of sheet metal from a coil of sheet metal prior to the step of securing the opposite ends of the piece of sheet metal together to form the tube.

The steps of moving the roller outwardly to contact an interior surface of the tube and deform the tube toward the die cavity, and rolling the roller around the perimeter of the interior of the tube to deform the perimeter of the tube toward the die cavity, can cause the tube to substantially conform to the profile of the die cavity.

In another aspect, a method of forming a pair of opposed side walls and a pair of opposed end walls of a sheet metal casket shell from a single piece of sheet metal, the piece of sheet metal having opposite ends and having a length equal to the combined length of the pair of side walls and the pair of end walls of the casket shell to be formed, comprises the steps of severing the piece of sheet metal from a coil of sheet metal, forming the piece of sheet metal into a rectangular tube so that the opposite ends of the piece of sheet metal abut, welding the opposite ends of the piece of sheet metal together, grinding the welded ends of the piece of sheet metal smooth, positioning a roll forming roller in an interior of the tube, positioning a female die configured to produce a desired profile for the side walls and the end walls of the casket shell around an exterior of the tube, moving the roller outwardly so as to contact an interior surface of the tube and deform the tube toward a die cavity of the female die, and rolling the roller around a perimeter of the interior of the tube so as to deform the perimeter of the tube toward the die cavity of the female die, thereby producing the desired profile for the side walls and the end walls of the casket shell.

Various embodiments of the inventive method thus provide a number of advantages over and above the commonly employed process for forming a sheet metal casket shell described above. For example, only a single sheet of sheet metal must be handled instead of four separate sheets of sheet metal. The welding operation occurs in only one location on a flat surface that can be easily ground and finish sanded. Because the weld is located on a flat surface the grinding and sanding operations can be performed automatically by a machine. The initial forming of the single sheet of sheet metal into the rectangular shape can be performed on a simple brake press, either manually or automatically. All of the profile forming of the shell side walls and end walls can be performed on one machine on the entire shell all at once. The inventive method requires less labor, produces a stronger overall one piece (side walls and end walls) shell, reduces the chances of the shell becoming damaged since less handling is required, requires fewer consumables such as welding wire and sanding discs and consequently consumes less energy, and is cleaner.

DRAWINGS

DESCRIPTION

Figure 1:
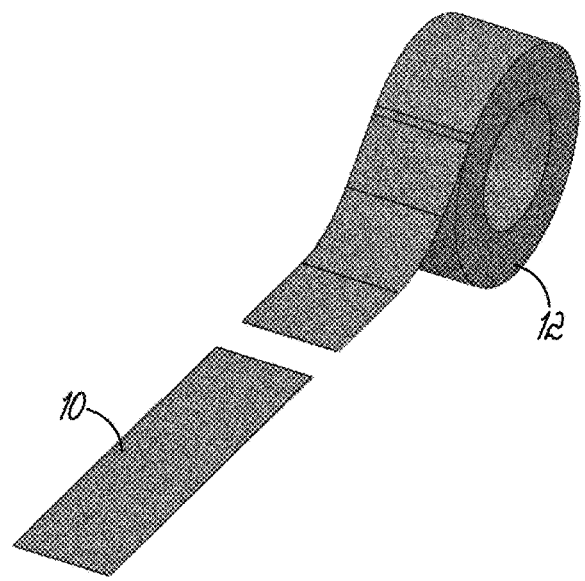
FIG. 1 is a diagrammatic perspective view of the step of blanking a casket shell side panel from a coil of sheet metal in the prior art method of forming a sheet metal casket shell.
Figure 2:
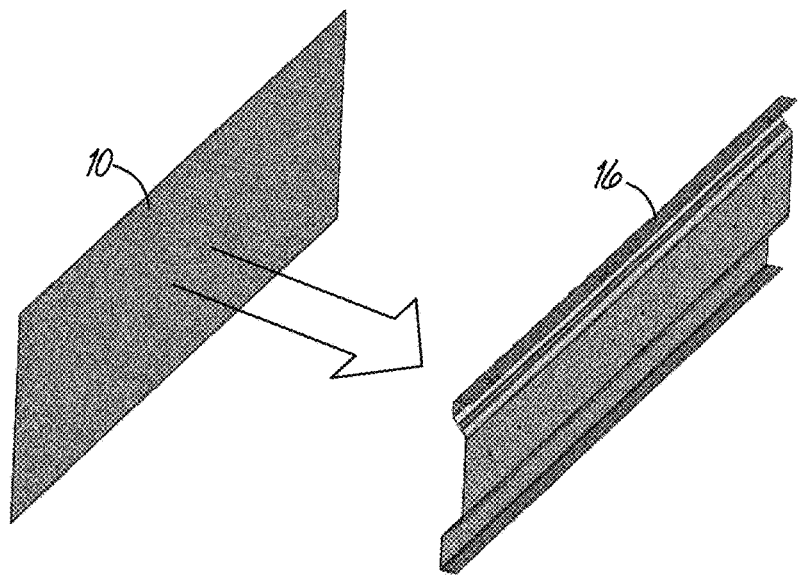
FIG. 2 is a diagrammatic perspective view of the step of stamping the casket shell side panel to form the casket shell side wall in the prior art method of forming a sheet metal casket shell.
Figure 3:
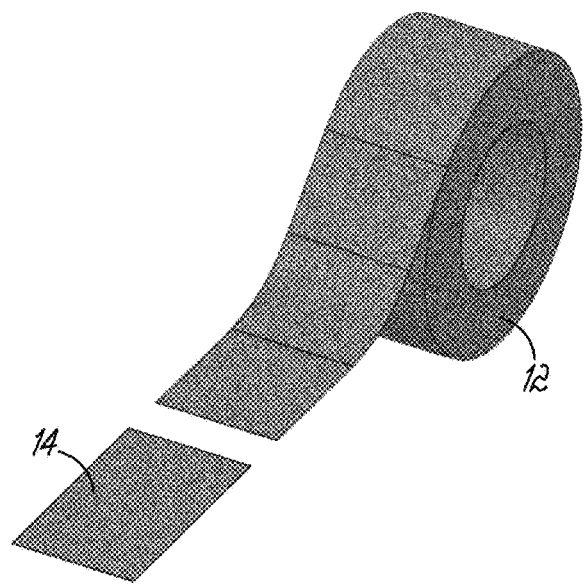
FIG. 3 is a diagrammatic perspective view of the step of blanking a casket shell end panel from a coil of sheet metal in the prior art method of forming a sheet metal casket shell.
Figure 4:
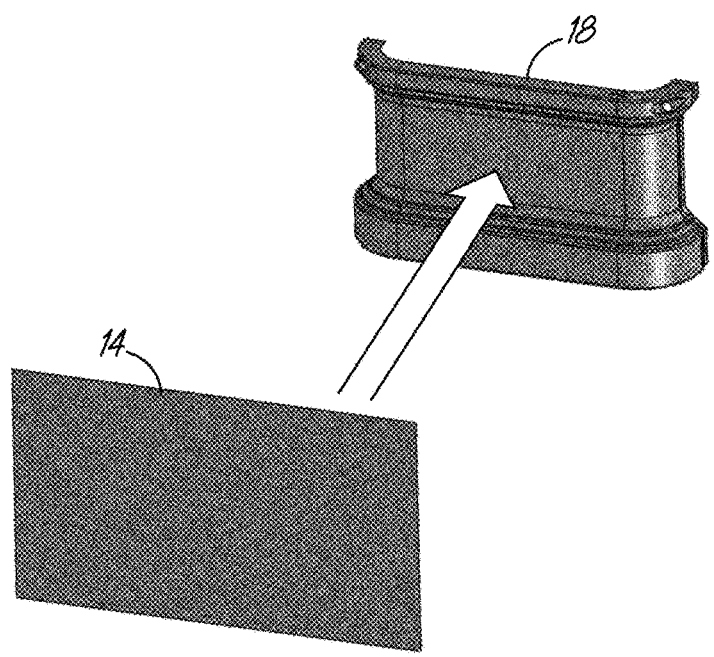
FIG. 4 is a diagrammatic perspective view of the step of stamping the casket shell end panel to form the casket shell end wall in the prior art method of forming a sheet metal casket shell.
Figure 5:
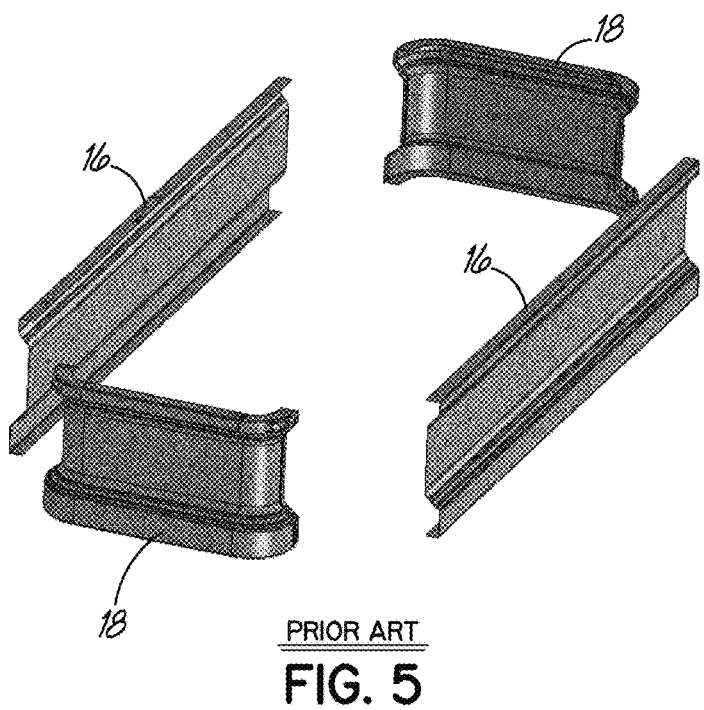
FIGS. 5 and 6 are diagrammatic perspective views of the step of assembling and fixturing the casket shell side walls and ends walls for welding in the prior art method of forming a sheet metal casket shell.
Figure 6:
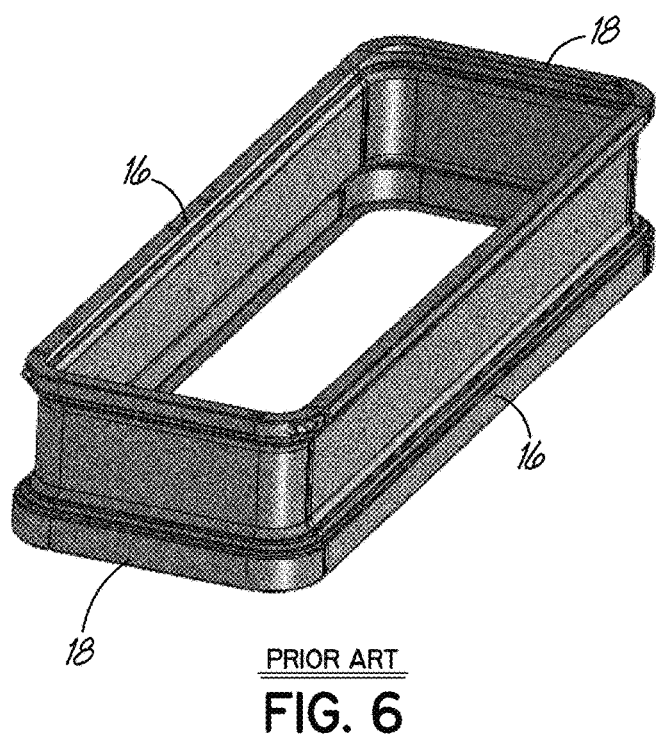
Figure 7:
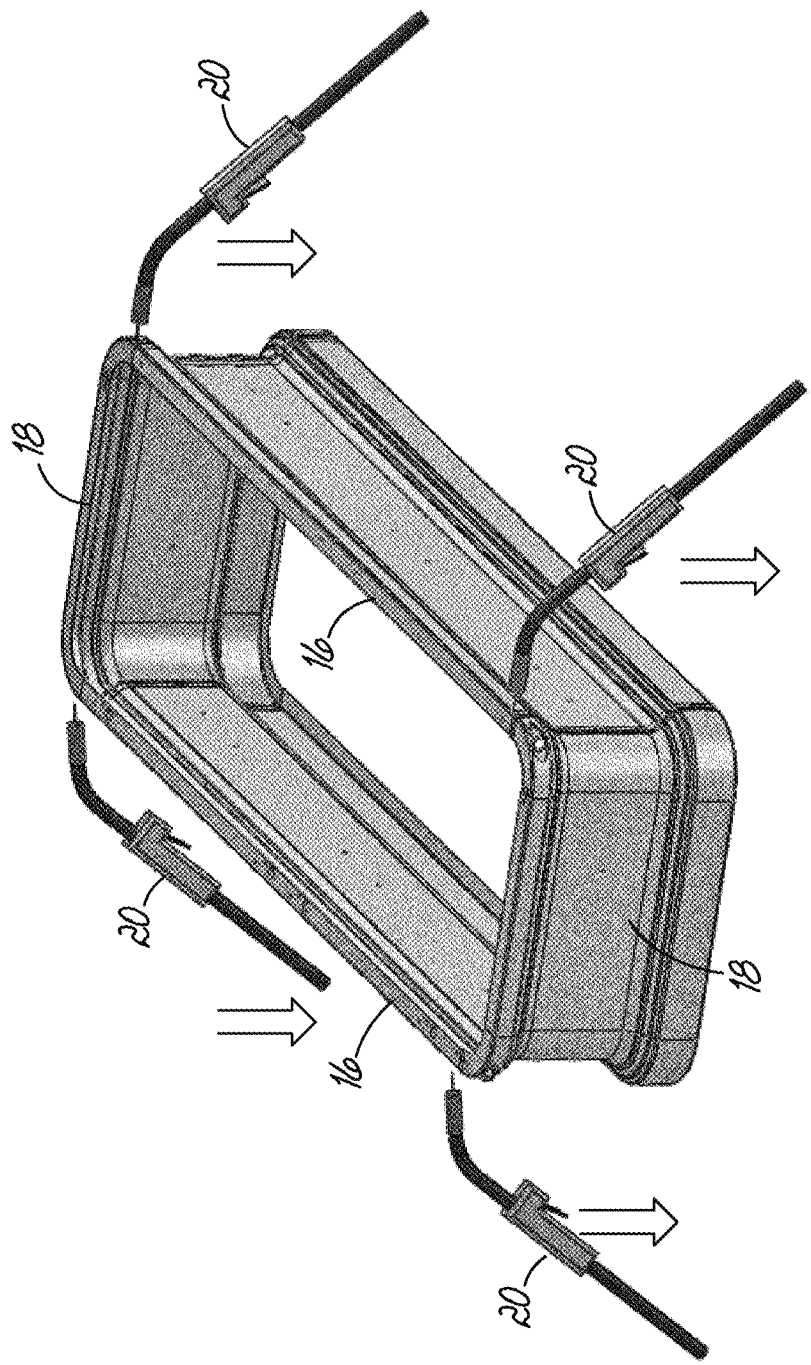
FIG. 7 is a diagrammatic perspective view of the step of welding the casket shell side walls and end walls together in the prior art method of forming a sheet metal casket shell.
Figure 8:
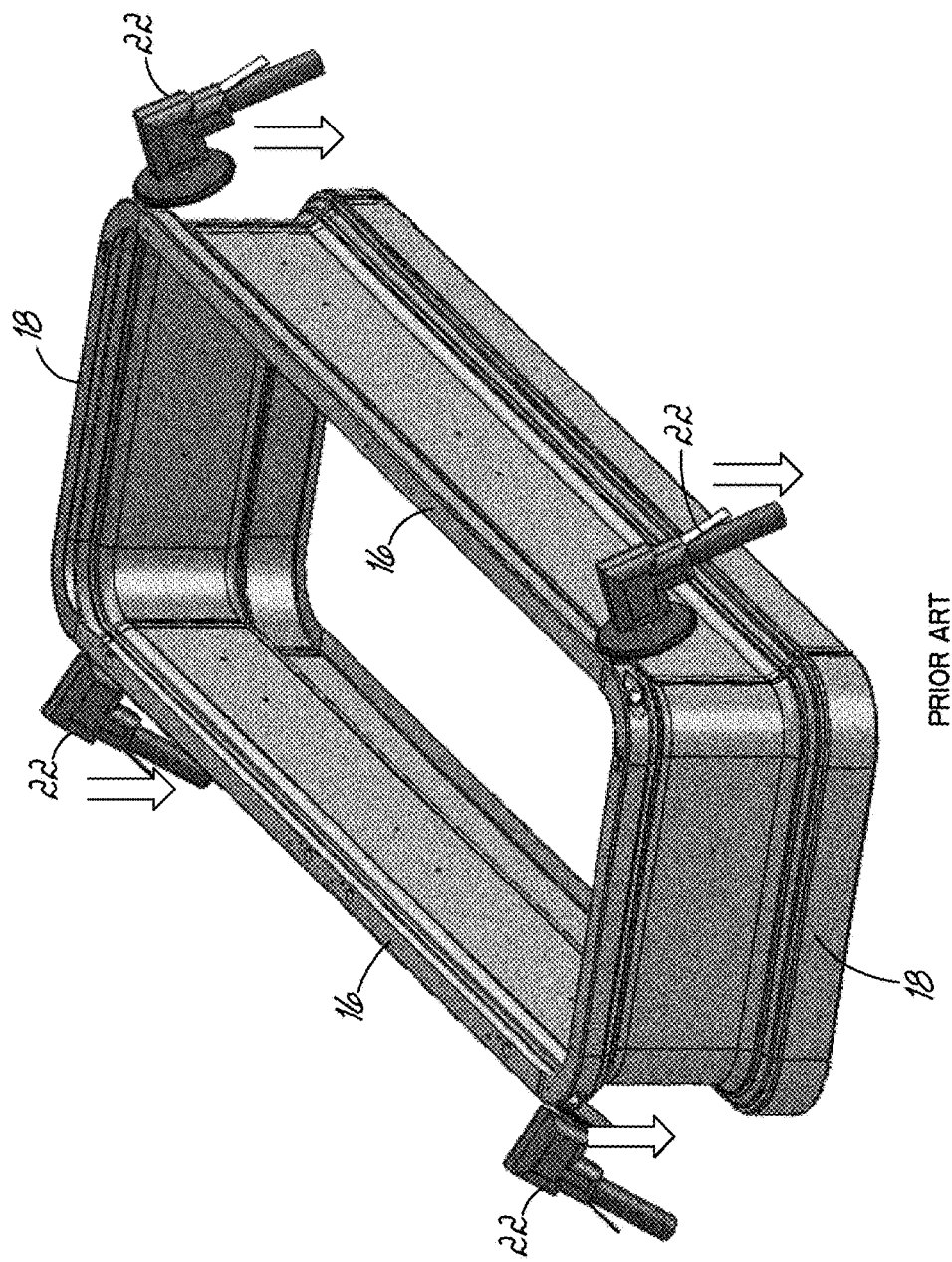
FIG. 8 is a diagrammatic perspective view of the step of grinding the four welds smooth in the prior art method of forming a sheet metal casket shell.
Figure 9:
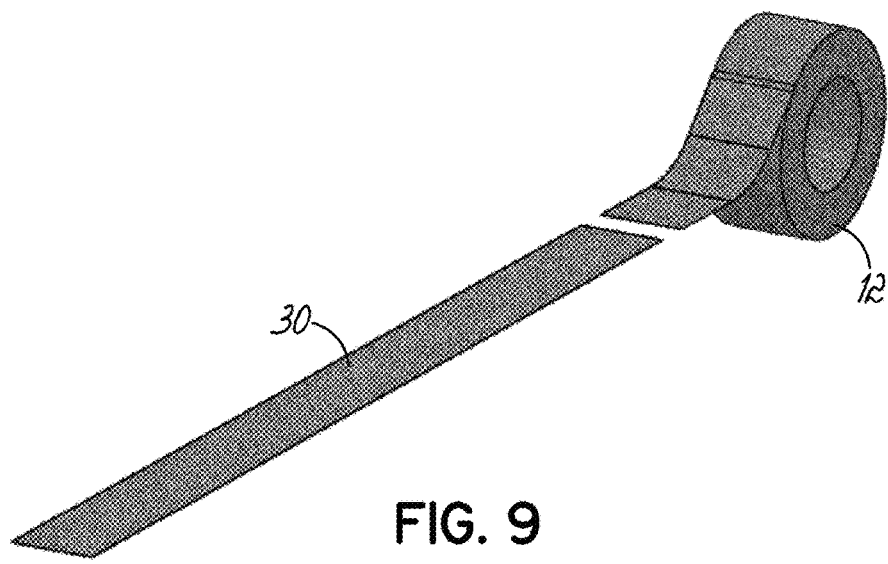
FIG. 9 is a diagrammatic perspective view of the step of blanking the casket shell side panels and end panels as a single piece of sheet metal from a coil of sheet metal in the present method of forming a sheet metal casket shell.

Referring to FIG. 9, a single piece of sheet metal 30, having a length equal to the combined length of the casket shell side walls and end walls of the casket shell to be formed, is blanked from the coil 12 of sheet metal.

Figure 10:
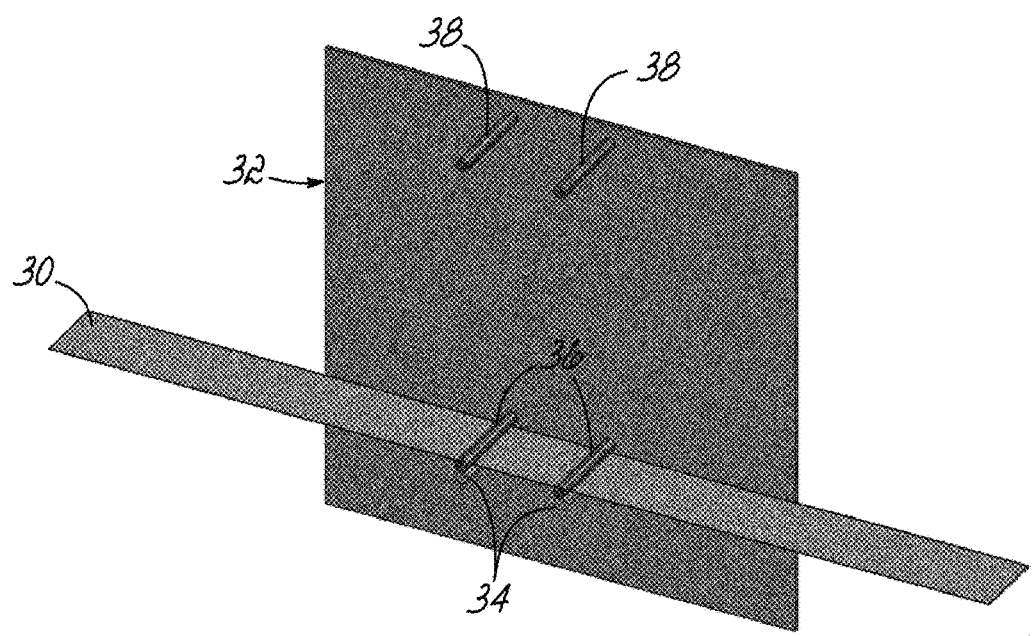
FIGS. 10-12 are diagrammatic perspective views of the steps of forming the piece of sheet metal into a rectangular tube in the present method of forming a sheet metal casket shell.
Figure 12:
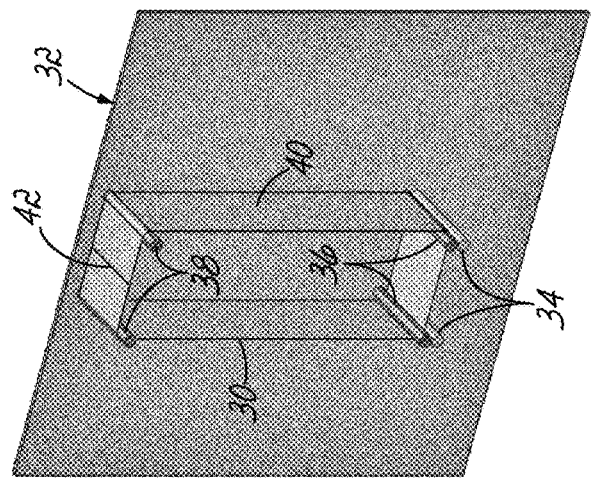
Figure 11:
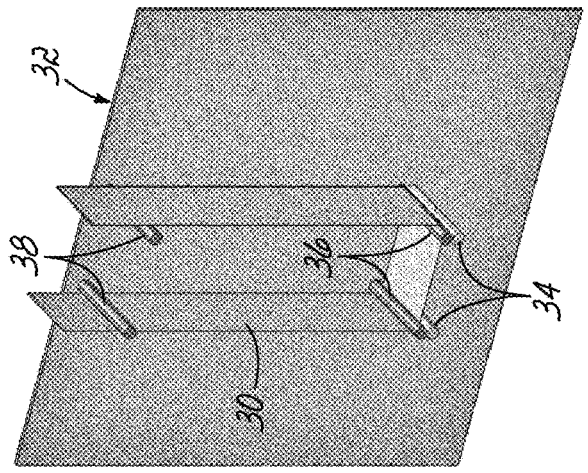

Referring to FIGS. 10-12, the piece of sheet metal 30 is transferred to a forming machine 32. An exemplary forming machine 32 can have a first pair of posts 34, 34, a second pair of posts 36, 36, and a third pair of posts 38, 38. The piece of sheet metal 30 is slid between the first and second pairs of posts 34, 34 and 36, 36, and is bent upwardly and around third pair of posts 38, 38 to form a rectangular tube 40. The opposite ends of the piece of sheet metal abut at 42.

Figure 13:
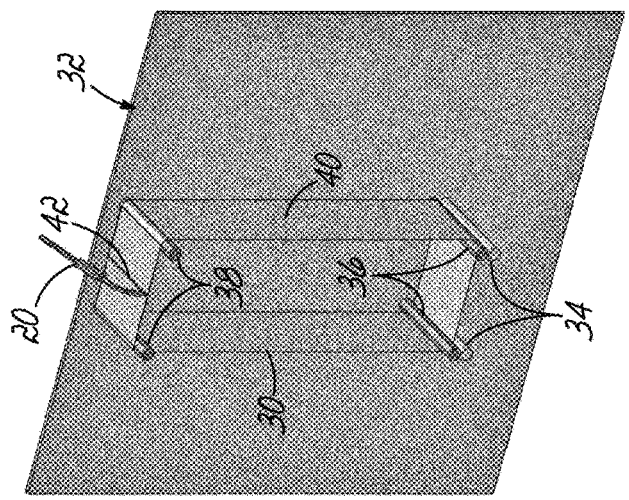
FIG. 13 is a diagrammatic perspective view of the step of welding the abutting opposite ends of the piece of sheet metal together in the present method of forming a sheet metal casket shell.

Referring to FIG. 13, the abutting opposite ends of the piece of sheet metal are welded at 42 with a welder 20. Advantageously, the abutting opposite ends can be located as shown in FIGS. 12 and 13, i.e. medially of one of the casket shell end walls. Such a location provides for convenient grinding and clean up of the weld line.

Figure 14:
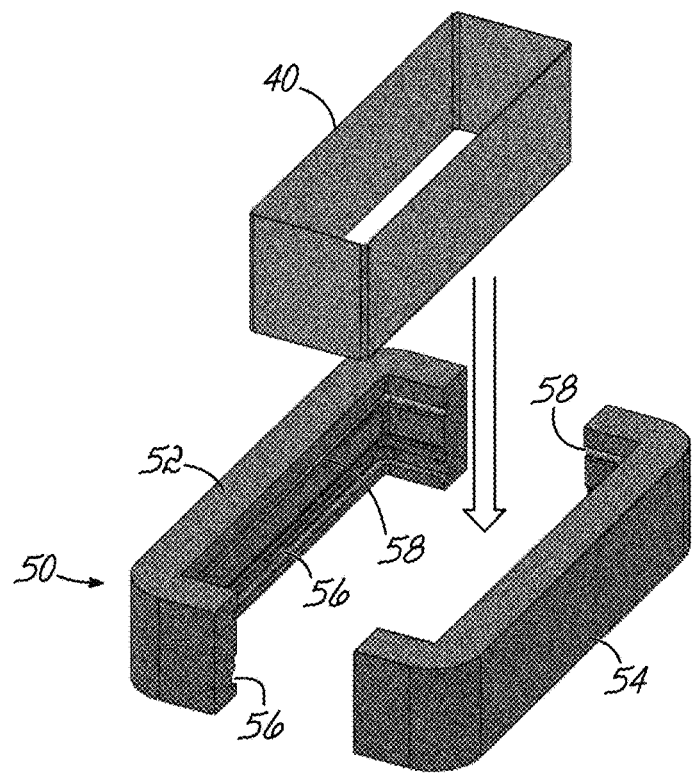
FIGS. 14-16 are diagrammatic perspective views of the steps of positioning a female die configured to produce a desired profile for the casket shell side walls and end walls around the rectangular tube in the present method of forming a sheet metal casket shell.
Figure 15:
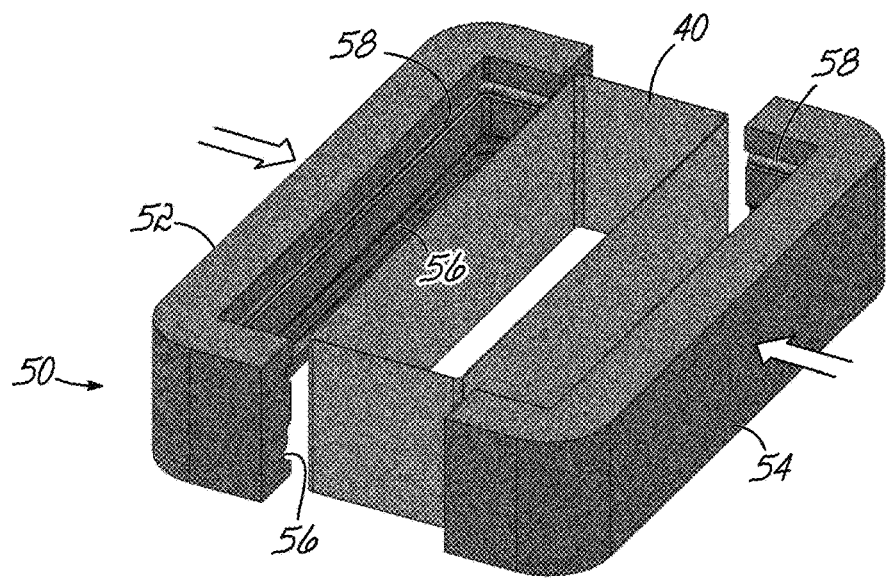
Figure 16:
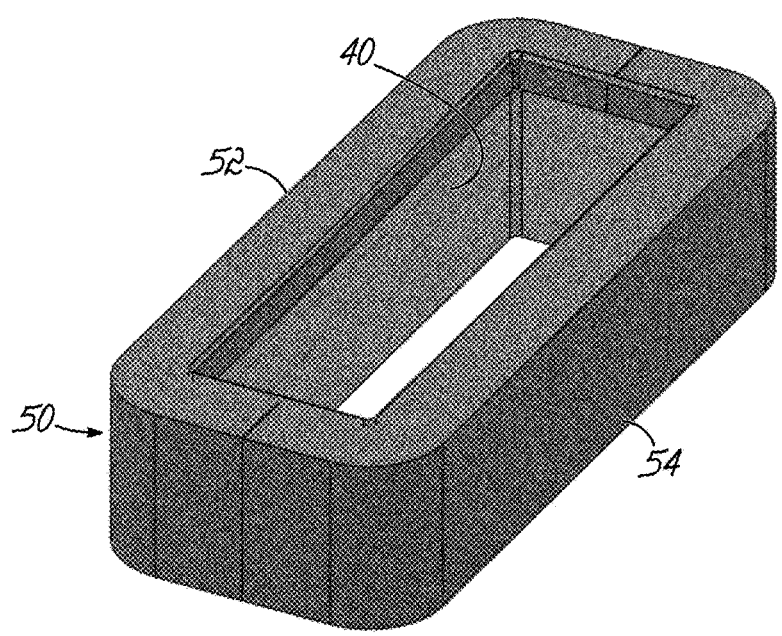

Referring to FIGS. 14-16, a die 50 is placed around the rectangular tube 40. The die 50 comprises a pair of female dies 52, 54. Each of the female dies 52, 54 includes a base mold profile 56 and a top mold profile 58. The rectangular tube 40 is held in place by internal clamping (not shown for clarity).

Figure 17:
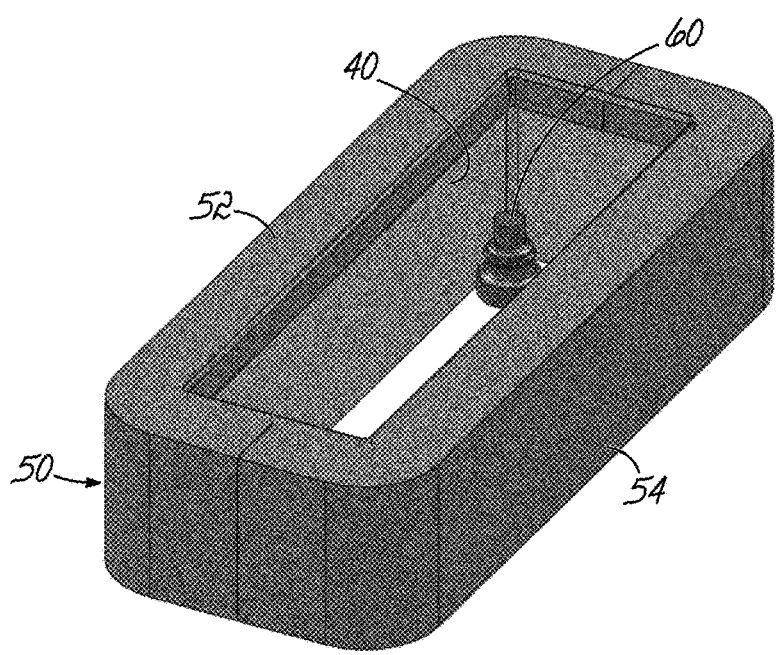
FIG. 17 is a diagrammatic perspective view of the step of positioning a roll forming roller in a lower position of an interior of the rectangular tube in the present method of forming a sheet metal casket shell.

Referring to FIG. 17, a roll forming roller 60 is positioned in an interior of the rectangular tube 40 (support structure for roller 60 not shown for clarity). As illustrated, roller 60 is positioned in a lower portion of the tube 40 so as to form the base mold profile of the casket shell side and end walls.

Figure 18:
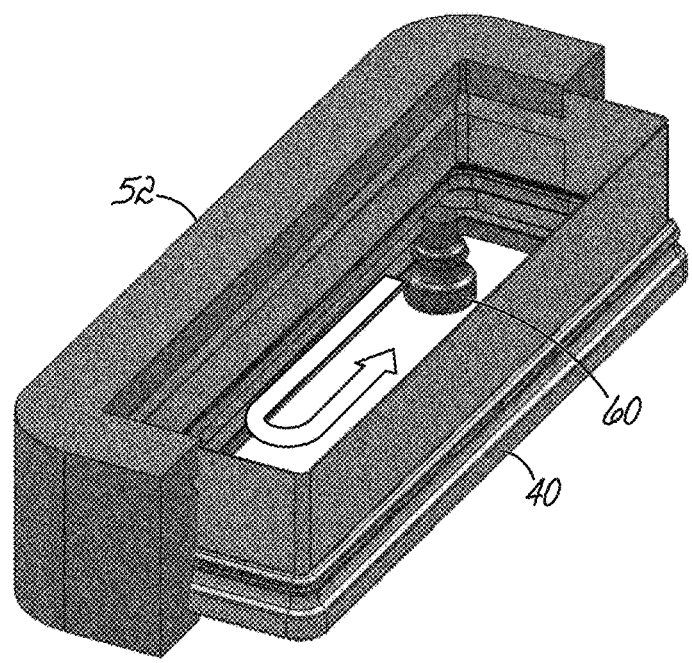
FIG. 18 is a diagrammatic perspective view of the step of moving the roller outwardly and around a perimeter of the interior of rectangular tube to create the desired base mold profile of the casket shell side and end walls in the present method of forming a sheet metal casket shell.

Referring to FIG. 18, roller 60 is moved outwardly so as to contact an interior surface of the tube 40 and deform the tube 40 toward the die cavity 56. Roller 60 is then rolled around a perimeter of the interior of the tube 40 so as to deform the perimeter of the tube 40 toward the die cavity 56 of the female dies 52, 54 (female die 54 not shown for clarity). More than one roller 60 with differing profiles may be required to fully form the base mold of the casket shell side and end walls, and more than one complete pass around the perimeter of the interior of the tube 40 may be required to fully form the base mold profile of the casket shell side and end walls.

Figure 19:
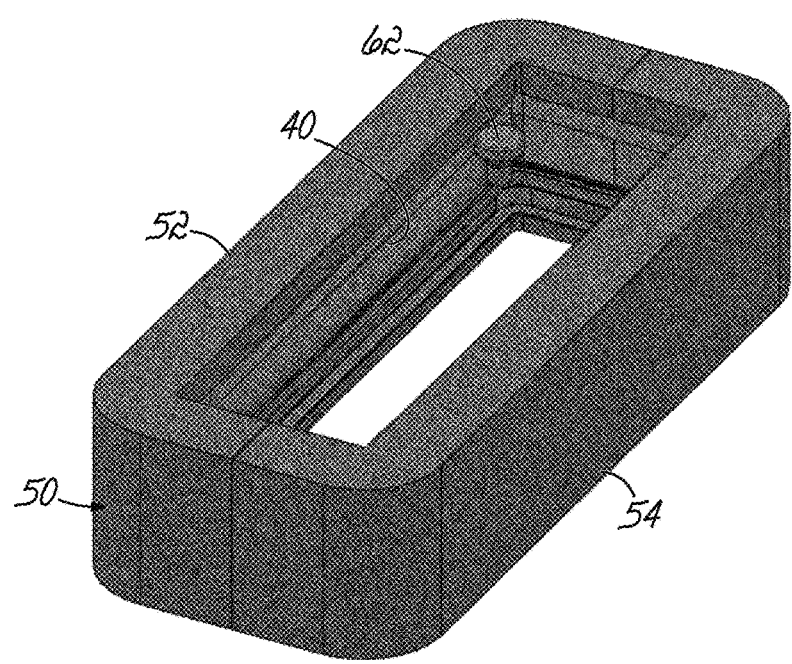
FIG. 19 is a diagrammatic perspective view of the step of positioning a roll forming roller in an upper position of the interior of the rectangular tube in the present method of forming a sheet metal casket shell.

Referring to FIG. 19, another roll forming roller 62 is positioned in an interior of the rectangular tube 40 (support structure for roller 62 again not shown for clarity). As illustrated, roller 62 is positioned in an upper portion of the tube 40 so as to form the top mold profile of the casket shell side and end walls.

Figure 20:
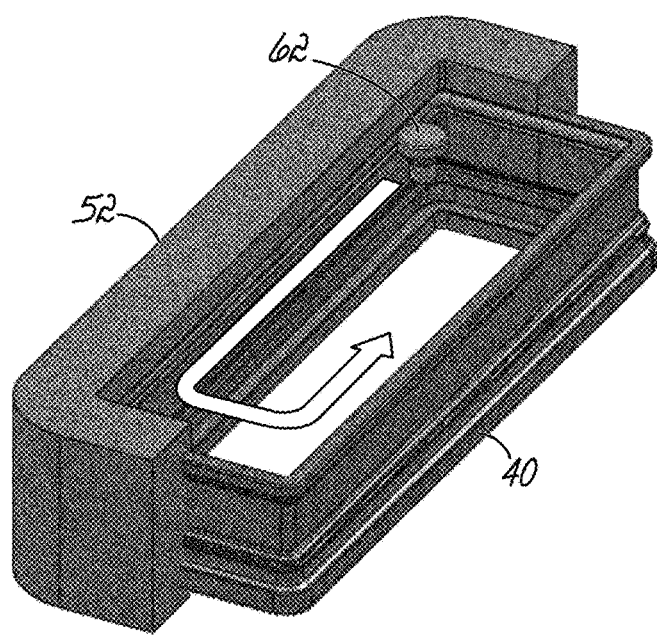
FIG. 20 is a diagrammatic perspective view of the step of moving the roller outwardly and around a perimeter of the interior of the rectangular tube to create the desired top mold profile of the casket shell side and end walls in the present method of forming a sheet metal casket shell.

Referring to FIG. 20, roller 62 is moved outwardly so as to contact an interior surface of the tube 40 and deform the tube 40 toward the die cavity 58. Roller 62 is then rolled around a perimeter of the interior of the tube 40 so as to deform the perimeter of the tube 40 toward the die cavity 58 of the female dies 52, 54 (female die 54 not shown for clarity). More than one roller 62 with differing profiles may be required to fully form the top mold of the casket shell side and end walls, and more than one complete pass around the perimeter of the interior of the tube 40 may be required to fully form the top mold profile of the casket shell side and end walls.

If desired, a single roller could be utilized to simultaneously form the base mold and the top mold, and/or base mold, top mold, and intermediate profile intermediate the base mold and top mold. (Casket shells that have a top mold profile/curvature, bottom mold profile/curvature, and a profile/curvature intermediate the top mold and bottom mold are known as "urn" casket shells, and can be formed by the principles of the present invention.) Or, four rollers could be utilized, one in each corner of the rectangular tube 40. The four rollers could be simultaneously moved outwardly to create an initial set in the corners of the rectangular tube 40. Then, three of the rollers could be removed from the interior of the tube 40, and the remaining roller could be caused to roll around the perimeter of the interior of the tube 40. One set of four rollers could be utilized to form the base mold profile and another set of four rollers could be utilized to form the top mold profile, or one set of four rollers could be utilized to simultaneously form the base mold and the top mold, and/or base mold, top mold, and intermediate profile intermediate the base mold and top mold. The invention can be practiced by fixing the roller in space and rotating the tube and female dies so as to roll the roller around a perimeter of the interior of the tube, as well as by fixing the tube and female dies in space and rotating the roller so as to roll the roller around a perimeter of the interior of the tube. Both such techniques shall be deemed to be embraced by the phrase "rolling the roller around a perimeter of the interior of the tube."

Figure 21:
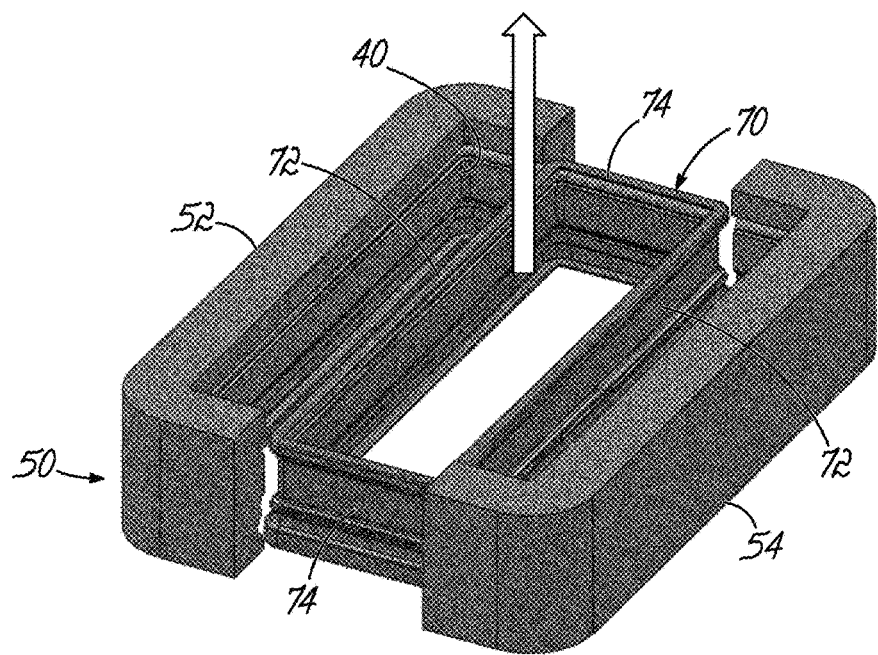
FIG. 21 is a diagrammatic perspective view of the step of removing the female die from the formed casket shell side and end walls in the present method of forming a sheet metal casket shell.

Referring to FIG. 21, the female dies 52, 54 are removed, leaving the fully formed casket shell 70 comprising side walls 72 and end walls 74. The bottom wall or panel may then be welded to the lower edges of the side walls 72 and end walls 74 as is conventional. In this connection the bottom flange to which the bottom wall is welded could be formed with a separate roller or rollers pushing inwardly, rather than the female die; the top flange (against which the casket lid seats) could also be formed this way.

One roll forming machine that can be used to form the casket shell 70 is the model VBU 1200 available from Lucas of Chiuppano, Italy.

The embodiments shown and described are merely for illustrative purposes only. The drawings and the description are not intended to limit in any way the scope of the claims. Those skilled in the art will appreciate various changes, modifications, and other embodiments. All such changes, modifications and embodiments are deemed to be embraced by the claims. Accordingly, the scope of the right to exclude shall be limited only by the following claims and their equivalents.

What is claimed is:

1. A casket shell precursor from which to fabricate a casket shell, said casket shell precursor comprising a rectangular tube having a pair of opposed side walls and a pair of opposed end walls, said casket shell precursor comprising:
    a single continuous length of sheet metal having a pair of opposite ends, a planar cross-sectional profile, and configured into said side walls and said end walls,
    a rounded corner between adjacent ones of said side walls and said end walls, and
    a single weld on one wall of either said side walls or said end walls joining said opposite ends of said single continuous length of sheet metal,
    said casket shell precursor sized to contain the remains of a deceased.

2. The casket shell precursor of claim 1 wherein said one wall is one of said end walls.

3. The casket shell precursor of claim 2 wherein said weld is located medially along the length of said one end wall.

* * * * *